Sept. 1, 1925.                                                       1,551,827
J. B. LADD
PIPE ANNEALING FURNACE
Filed Dec. 14, 1921          7 Sheets-Sheet 4
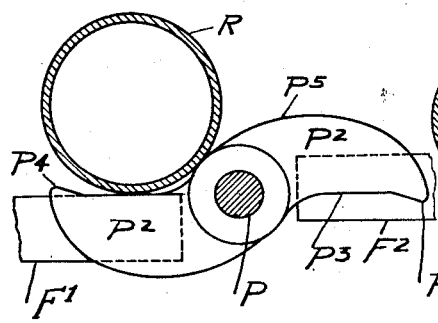
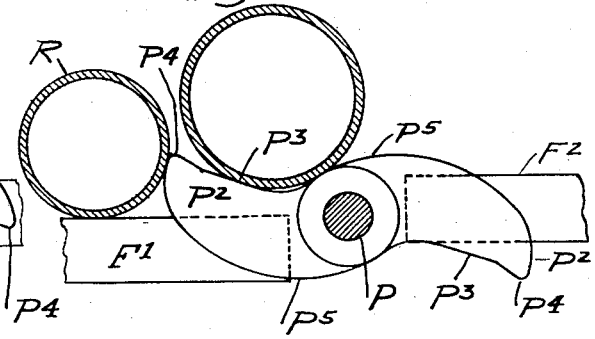
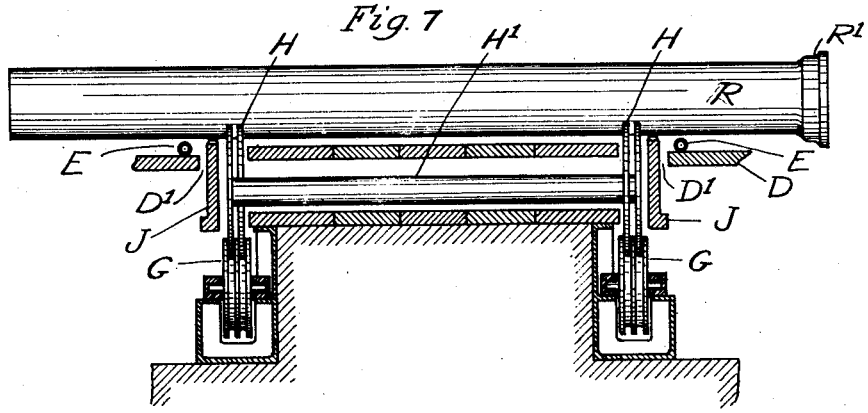
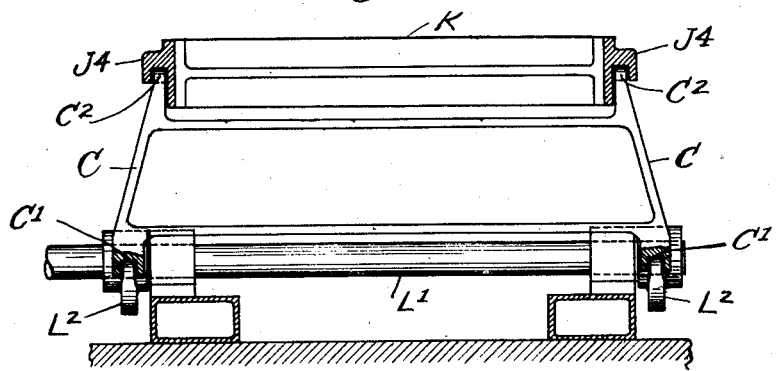
INVENTOR
James B. Ladd.
BY
ATTORNEY

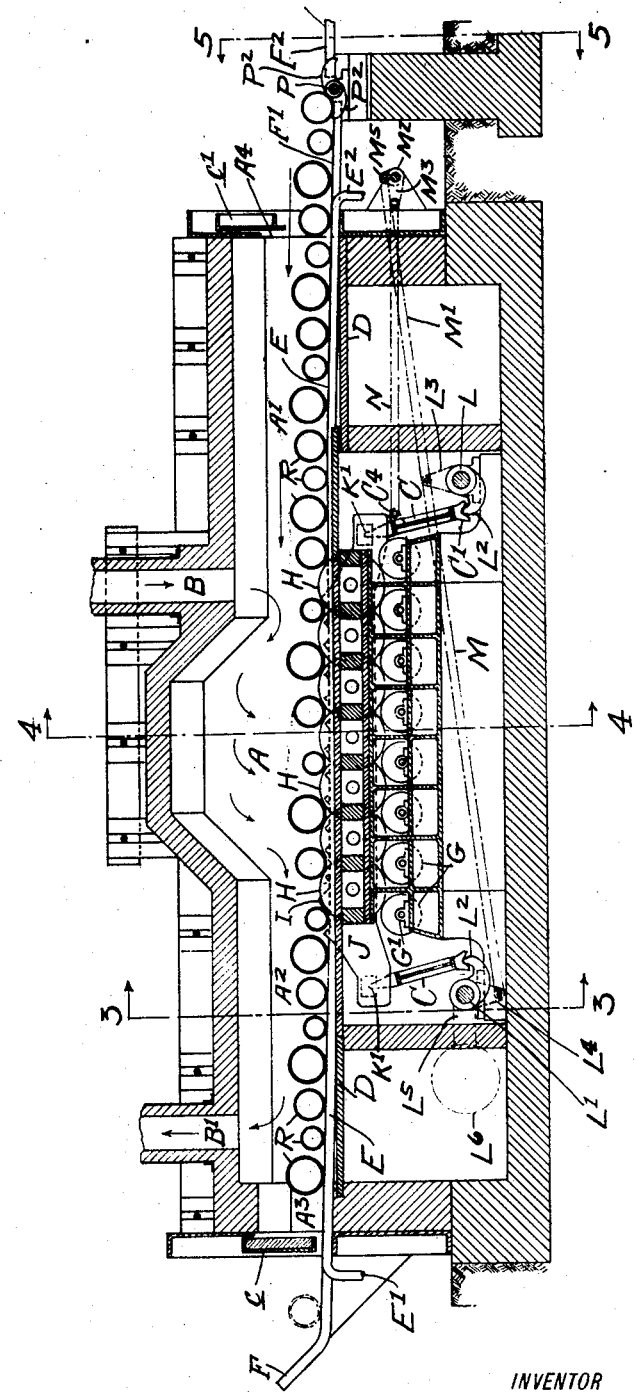

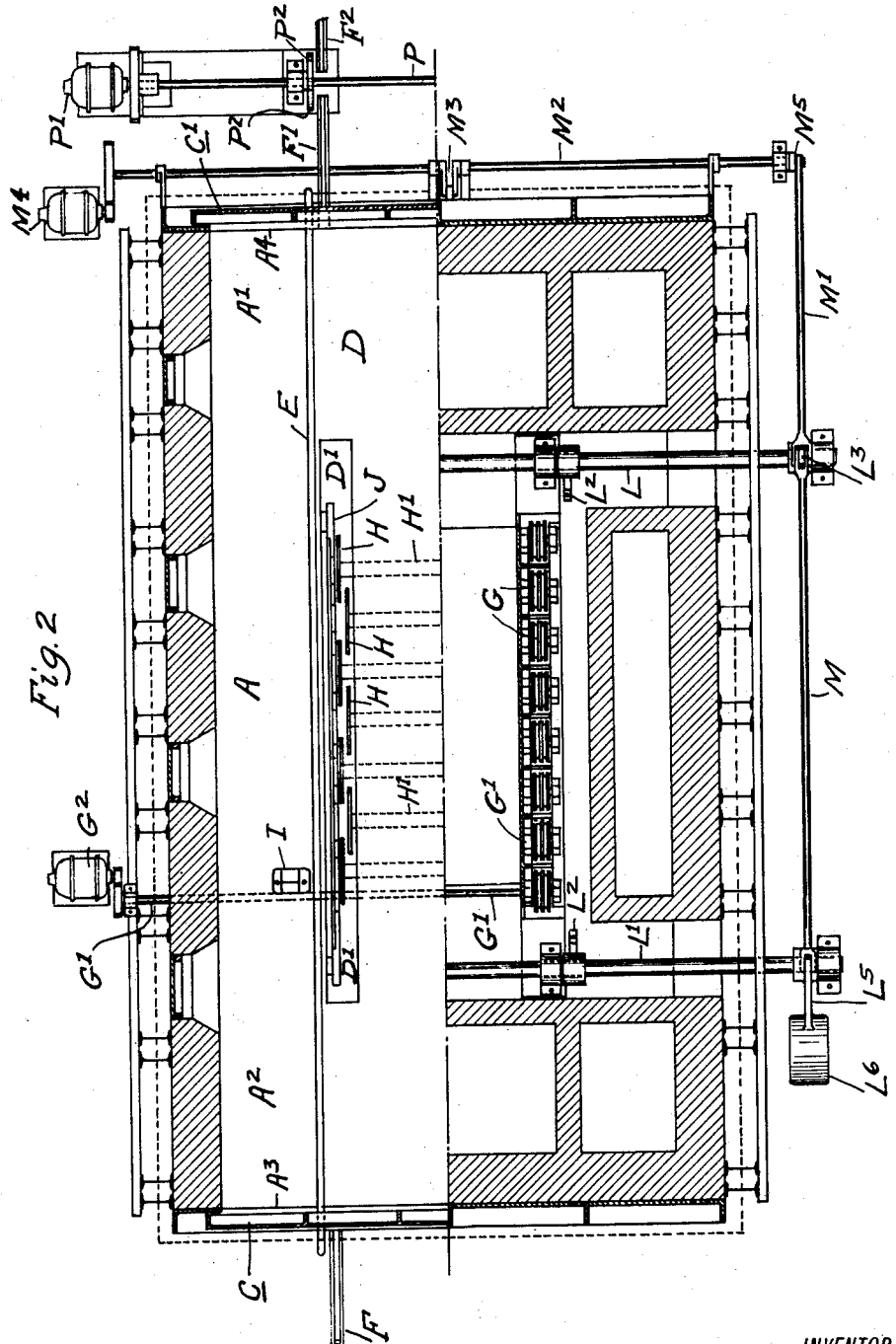

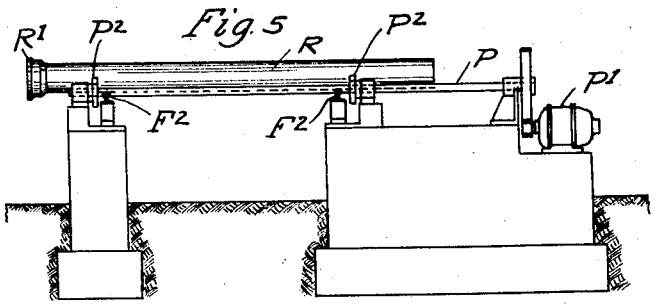
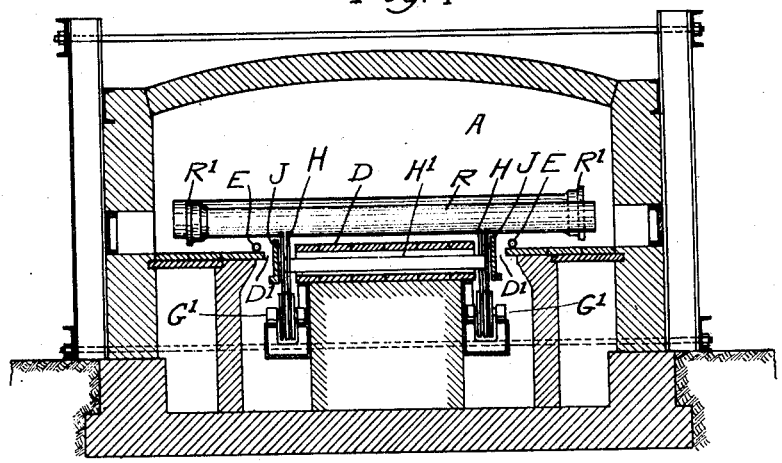
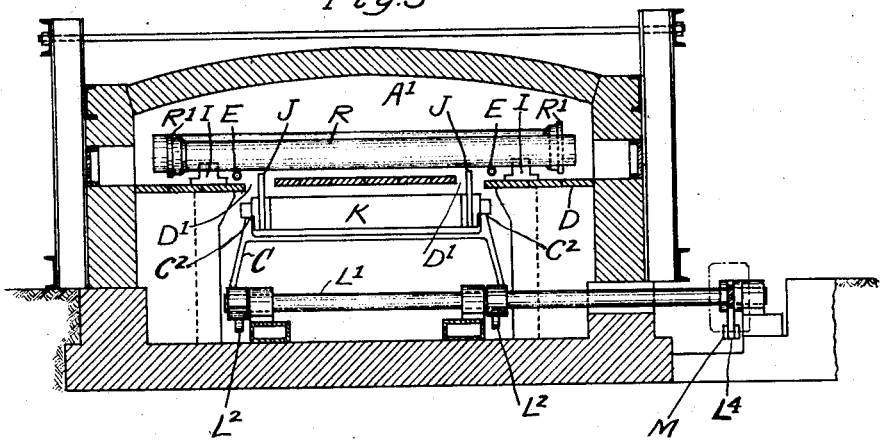

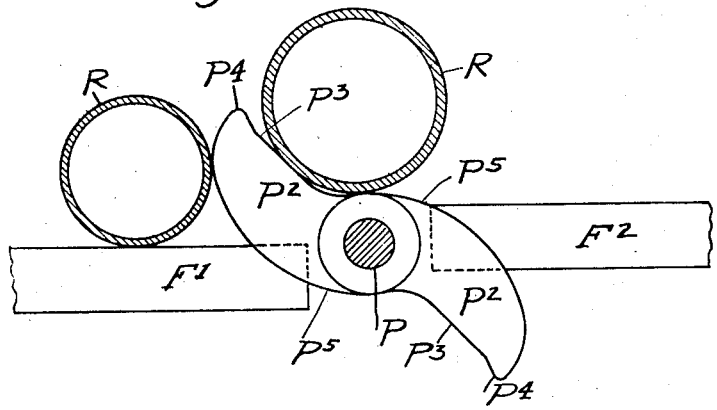
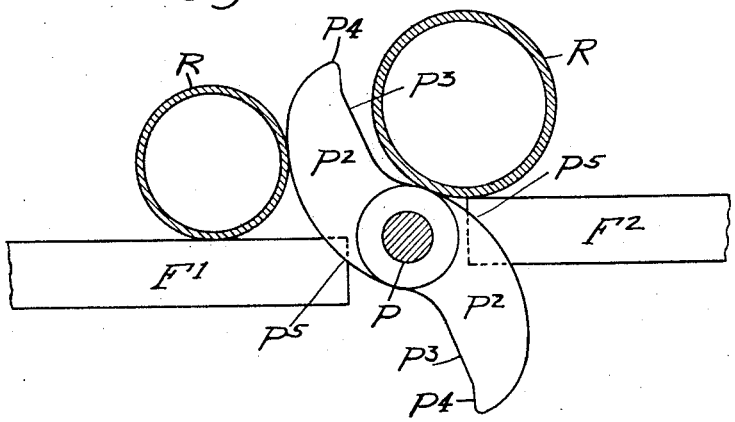
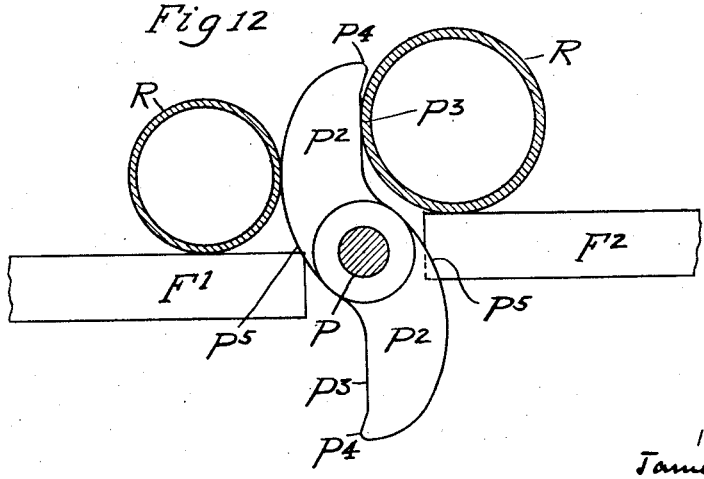

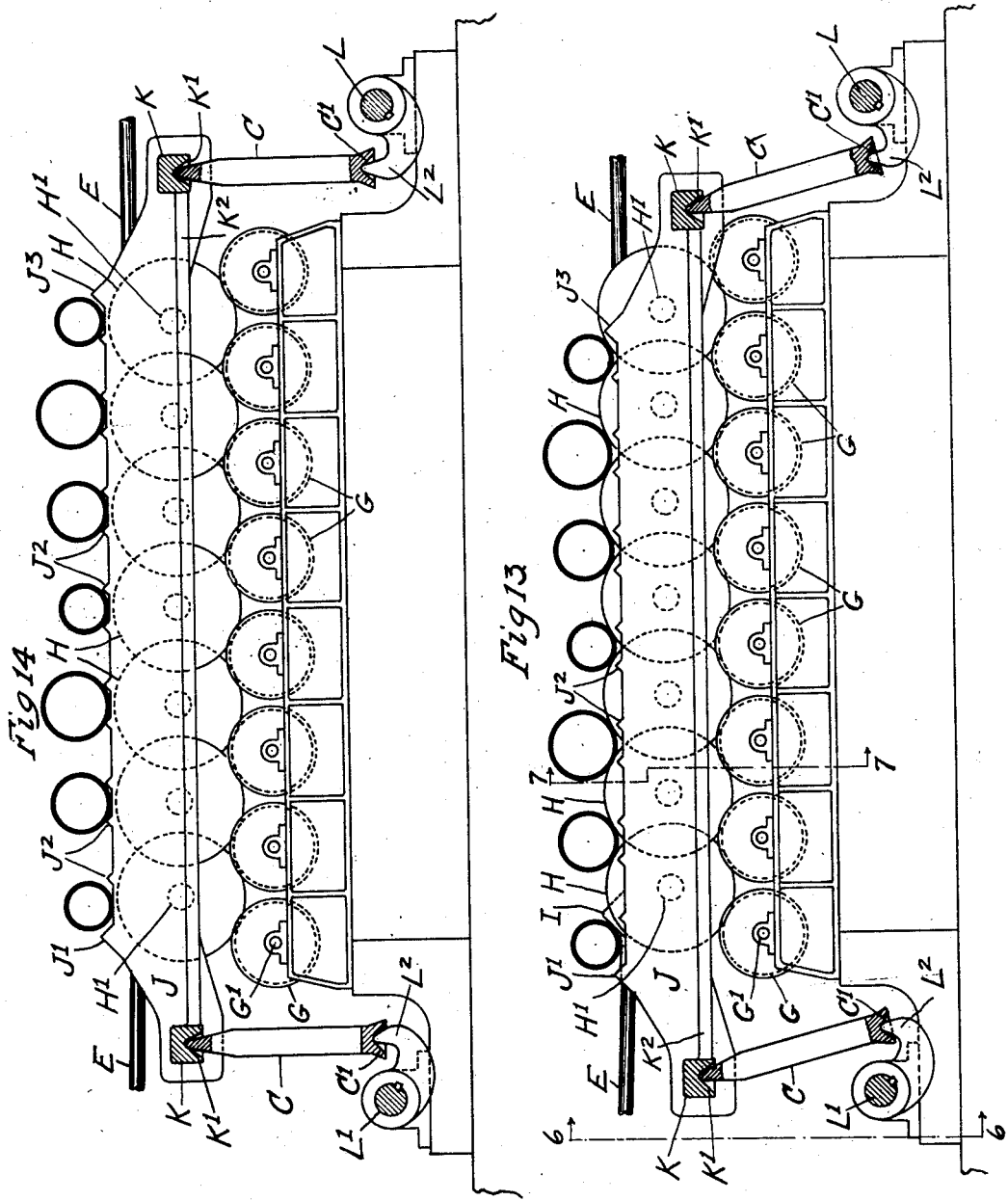

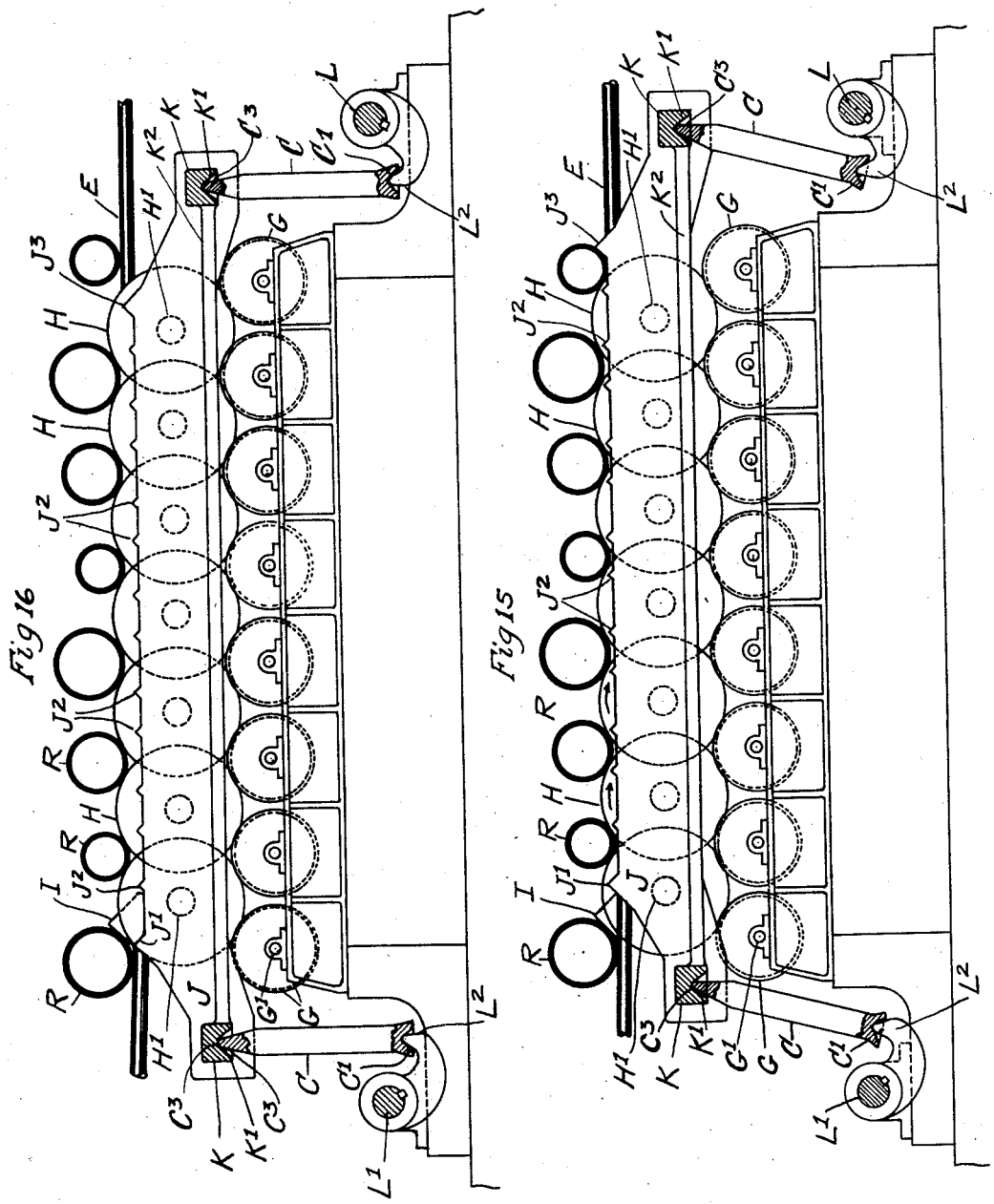

Patented Sept. 1, 1925.

1,551,827

UNITED STATES PATENT OFFICE.

JAMES B. LADD, OF ARDMORE, PENNSYLVANIA, ASSIGNOR TO UNITED STATES CAST IRON PIPE AND FOUNDRY COMPANY, OF BURLINGTON, NEW JERSEY, A CORPORATION OF NEW JERSEY.

PIPE-ANNEALING FURNACE.

Application filed December 14, 1921. Serial No. 522,248.

*To all whom it may concern:*

Be it known that I, JAMES B. LADD, a citizen of the United States of America, and resident of Ardmore, in the county of Montgomery, in the State of Pennsylvania, have invented certain new and useful Improvements in Pipe-Annealing Furnaces, of which the following is a true and exact description, reference being had to the accompanying drawings, which form a part thereof.

My invention relates to annealing furnaces for pipes and is especially adapted for the treatment of centrifugal cast pipes in which metal has been chilled during the casting operation. The pipes, during the annealing operation, are subjected to very high temperature and have a tendency to soften and get out of shape and it is one of the objects of my invention to provide means for rotating the pipes while in the heating zone of the furnace at the highest temperature so as to counteract their tendency to sag and become distorted. Another object of my invention is to provide for the regulated feeding of a series of pipes through the annealing furnace so that a multiple number of pipes will be transported at regulated speed through the front of the furnace where they are being raised in temperature through the hot zone and through the rear portion of the furnace in which last portion the pipes are considerably lowered in temperature before delivery from the furnace.

The nature of my improvements will be best understood as described in connection with the drawings in which they are illustrated and in which—

Figure 1 is a side sectional elevation of my improved furnace taken approximately on the center line of the furnace.

Figure 2 is a plan view of the furnace taken on the two horizontal sections, one immediately above the floor of the furnace and the other immediately above the rolls indicated at G.

Figure 3 is a cross sectional view on the line 3—3 of Fig. 1.

Figure 4 is a cross sectional view on the line 4—4 of Fig. 1.

Figure 5 an end view taken as from the line 5—5 of Fig. 1.

Figure 6 is an end view taken from the line 6—6 of Fig. 13.

Figure 7, a cross sectional view on the line 7—7 of Fig. 13.

Figures 8 to 12 are views of the feed mechanism which regulates the delivery of pipes from the furnace, the views being taken in progressive positions of the feeding device and showing this action on the pipes.

Figures 13 to 16 inclusive are a series of elevations showing the mechanism for rotating pipes in the heating zone of the furnace and for transporting the pipes progressively to the right of successive sets of rotating rollers, the four views showing progressive positions of the transporting mechanism and the manner in which it acts upon the pipes.

A indicates the main heating zone of the furnace; $A^1$ the rear end and $A^2$ the front end of the furnace. $A^3$ is the front end opening of the furnace and $A^4$ the rear opening of the furnace. B is the inlet passage for gases and $B^1$ the outlet passage or stack. $c$ is a gate for closing the entrance passage $A^3$ and $c^1$ a gate for closing the exit opening, $A^4$. D indicates the bottom or floor of the furnace in which, as shown, are formed longitudinal openings such as are indicated at $D^1$ in Fig. 2. E, E, are tracks or run-ways for the pipes preferably made of pipe so that water can be run through them to keep them cool. $E^1$ indicates the front end of the pipe run-way and $E^2$ the rear end and these run-ways are set on an incline so that the pipes will tend to roll from the front to the rear of the furnace. F indicates supporting inclined tracks at the front of the furnace on which the pipes are delivered and from which they run on to the tracks or run-ways E. $F^1$ indicates tracks preferably angular on which the pipes run after leaving the rear of the furnace. G, G, etc. are a series of friction rolls supported beneath the floor of the furnace and beneath the openings $D^1$ in the floor of the furnace and, as shown, the front roller G is attached to a shaft $G^1$ which is rotated by a motor indicated at $G^2$. H, H, etc. are a series of pipe supporting rolls resting on the rolls G and overlapping each other as shown. These rolls are kept in alignment by being attached to shafts $H^1$ and arranged, as shown. They provide a series of substantial supports for the pipes as is well indicated in Figs. 13, 14, 15 and 16. I, I, are projections secured to the floor of the furnace in position to form a buttress to engage the pipes as they approach the series of rolls H and hold the pipes in position to be properly engaged by the feeding device to be described. J, J, are feed bars the upper edges of which extend through the openings $D^1$ and are formed of a series of upwardly projecting fingers or teeth as indicated at $J^1$, $J^2$ and $J^3$. $J^4$, $J^4$, are lugs extending out from the sides of the bars J as best indicated in Fig. 6. The feed bars J are secured together and in position by being attached to a frame-work indicated at K, $K^2$, the cross bar portion K of this frame being enlarged as indicated at $K^1$. L and $L^1$ are rock shafts provided with projecting arms indicated at $L^2$, the rock shaft L having an upwardly projecting arm $L^3$, and the rock shaft $L^1$ having a downwardly projecting arm $L^4$, as shown, see Fig. 1; the rock shaft $L^1$ is also provided with a lever arm $L^5$ having at its end a counterweight indicated at $L^6$. M is a link connecting the lever arms $L^3$ and $L^4$ and $M^1$ a link connecting the lever arm $L^3$ to a crank arm $M^5$ on a shaft $M^2$ which shaft is also provided with a crank $M^3$ and is actuated, as shown, by a motor indicated at $M^4$. N is a link connecting the crank $M^3$ with the pin $C^4$ attached to the support C which is nearest the rear of the machine. C, C, are supports for the feed bars J, the general conformation of which is best shown in Fig. 6. At the bottom these support are notched as indicated at $C^1$ so as to engage and rest upon the upwardly turned ends of the levers $L^2$ while the upper ends are provided with fingers indicated at $C^2$, Fig. 6, for engaging the lugs $J^4$ and with tapered ends indicated at $C^3$ which engage in the notches $K^1$ of the cross bar K.

P is a shaft rotated by a motor indicated at $P^1$ and to which are attached the pipe engaging stops and feeding device indicated at $P^2$, $P^2$. These stops are preferably given a form such as indicated, that is, with somewhat recessed front faces indicated at $P^3$ ending in projections $P^4$ while the rear faces are curved, as indicated at $P^5$. R, R, etc. indicate the pipes having, as shown, bell ends $R^1$ and which are preferably fed to the annealing furnace with their bell ends in alternately opposite directions so as to space the bodies of the pipes apart.

In operation the pipes are fed on to the receiving tracks F and rolled by gravity over the inclined runway E the pipes in advance of the stops I being held from further movement through the furnace by these stops which, however, are not absolutely necessary. The rotation of the shaft $M^2$ through its crank arm $M^5$, the link $M^1$ and the lever arm $L^3$ rocks the shaft L while at the same time the rocking motion is imparted to the shaft $L^1$ through the link M attached to its lever arm $L^4$. The rocking of the shaft imparts, of course, a rocking motion to the attached levers $L^2$, $L^2$, and this motion imparts through the supports C, C, an up and down motion to the feed bars J while, at the same time, the crank $M^3$ attached to the shaft $M^2$ imparts to the link N a backward and forward motion to the feed bars J. The result of these motions imparted to the feed bars is best shown in Figures 13 to 16. In Fig. 13, the feed bars are shown in the positions they occupy at the beginning of their cycle of movement and it will be observed that fingers $J^1$ lie beneath and slightly in advance of the pipes which are supported on the stops I. The next movement of the feed bars is an upward and rearward movement to the position shown in Fig. 14 in which the fingers $J^2$ have engaged the pipes supported on the rotating rollers, lifted them from the rollers and transported them through half the distance of one successive set of rollers. In Fig. 15, the feed bars, after moving rearwardly and downwardly, depositing the pipes again on the rollers in advanced positions and in Fig. 16 the feed bars have moved down and back to a point intermediate their positions as shown in Figures 15 and 13.

It will be observed that in each cycle of movement of the feed bars one pipe is lifted from the front portion of inclined tracks E onto the rotating rollers the pipes on the rotating rollers are shifted rearward and the last pipe on the rollers is deposited upon the rear portion of the track E. On this rear portion of the track E the pipes roll by gravity through the rear of the furnace and out of its rear opening onto the track $F^1$. Here the pipes come successively into operative relationship with the intermittently acting stop device which rolls the pipes one by one and at a regulated speed of operation which will insure the pipes remaining in the rear of the furnace for such period of time as is desirable. By preference, this stop device is of the construction best shown in Figures 8 to 12 inclusive and operates in the manner indicated in these figures. Thus, it will be seen in Fig. 8 that the pipe R is arrested by contact with the curved rear side $P^5$ of one of the fingers $P^2$ and rests on the end of the track $F^1$ immediately above the curved face $P^3$ of the other finger. A further rotation of the fingers thrusts the upwardly turned end $P^4$ of the rear finger $P^2$ up against the next succeeding pipe, as shown in Fig. 9, while the face $P^3$ of this finger lifts the pipe immediately above it and moves it backward, as shown in Figures 10, 11 and 12, until it is deposited on the track $F^2$. The next succeeding pipe, as shown in the series of figures is permitted to move gradually down the track $F^1$, as shown in Figures 9 to 12, and the pipes on the tracks E and F¹ are thus permitted to move and rotate gradually and practically continuously which is a matter of some importance, particularly with regard to the pipes which are still at such a high temperature that they may have a tendency to sag.

It will be observed that in my furnace, as illustrated, air to support combustion enters through the rear portion A¹ of the furnace and only meets the gases entering the furnace near the heat zone A. Consequently the temperature of the pipes is being rapidly reduced in the rear portion of the furnace. In the central or hot zone A of the furnace the pipes are at their highest temperature and, therefore, it is here that they should be given a fairly rapid motion of rotation. In the front portion or zone A² of the furnace the pipes which enter the furnace cold are being heated up and in this portion of the furnace it is accordingly not necessary that the comparatively rapid rotation which is desirable in the central zone of the furnace should be effected.

Having now described my invention, what I claim as new and desire to secure by Letters Patent, is:

1. In combination with a pipe annealing furnace having inclined pipe supporting means extending through the delivery end of the furnace and over which the pipes move by gravity through and out of the furnace, an intermittently acting stop mechanism consisting of two rotating fingers acting successively to engage the pipes as they come from the furnace and to release them at definite time intervals, said fingers having convexly curved cam shaped backs so shaped as to permit of a slow forward movement of the pipes while engaged by the backs of the rotating fingers.

2. In combination with a pipe annealing furnace having inclined pipe supporting extending through the delivery end of the furnace and over which the pipes move by gravity through and out of the furnace, an intermittently acting stop mechanism consisting of two rotating fingers having concave front faces and convex rear faces acting successively to engage the pipes as they come from the furnace and to release them at definite time intervals, said fingers being so shaped as to carry forward the pipes engaged by their concave front faces and to permit of a slow forward movement of the pipes engaged by their convex rear faces.

3. A pipe annealing furnace having in combination a series of pipe supporting and rotating rollers located in fixed position in the furnace and intermittently acting means for transporting the pipes progressively along said series of rollers.

4. A pipe annealing furnace having inclined means for supporting pipes at its front and rear ends, in combination with a series of pipe supporting and rotating rollers located in fixed position in the heating zone of the furnace and intermittently acting means for transporting pipes from the front incline to the rollers progressively along the rollers and from the rollers to the rear incline.

5. A pipe annealing furnace having inclined means for supporting pipes at its front and rear ends, in combination with a series of pipe supporting and rotatnig rollers located in fixed position in the heating zone of the furnace, intermittently acting means for transporting pipes from the front incline to the rollers, progressively along the rollers, and from the rollers to the rear incline and intermittently acting stop mechanism located at the rear of the furnace and operating to successively engage and release the pipes on the rear incline and regulate their rate of movement through the rear of the furnace.

6. A pipe annealing furnace having located in the furnace a series of pipe supporting and rotating rollers in combination with feed bars having spacing fingers on their upper edges and means for actuating said feed bars as described and so that they are moved successively upward to engage the pipes, rearward to transport the pipes along the series of rollers, downward to deposit the pipes on the rollers and forward to pipe engaging position.

JAMES B. LADD.